United States Patent
Damola

(10) Patent No.: US 9,723,042 B2
(45) Date of Patent: Aug. 1, 2017

(54) P2P STREAMING SUPPORT

(75) Inventor: Ayodele Damola, Solna (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 340 days.

(21) Appl. No.: 14/379,264

(22) PCT Filed: Jun. 8, 2012

(86) PCT No.: PCT/SE2012/050619
§ 371 (c)(1),
(2), (4) Date: Aug. 15, 2014

(87) PCT Pub. No.: WO2013/122525
PCT Pub. Date: Aug. 22, 2013

(65) Prior Publication Data
US 2015/0381675 A1    Dec. 31, 2015

Related U.S. Application Data

(60) Provisional application No. 61/599,646, filed on Feb. 16, 2012.

(51) Int. Cl.
*G06F 15/16* (2006.01)
*H04L 12/28* (2006.01)
(Continued)

(52) U.S. Cl.
CPC ...... *H04L 65/4076* (2013.01); *H04L 65/1069* (2013.01); *H04L 67/1078* (2013.01); *H04N 21/26616* (2013.01); *H04N 21/632* (2013.01)

(58) Field of Classification Search
CPC ... G06Q 10/10; H04L 29/06; H04L 29/08072; H04L 29/06027; H04L 12/581;
(Continued)

(56) References Cited

U.S. PATENT DOCUMENTS

2007/0177592 A1* 8/2007 Mooney ............... H04L 12/18
370/390
2010/0165902 A1* 7/2010 Kvernvik ............. H04L 12/189
370/312
(Continued)

FOREIGN PATENT DOCUMENTS

WO    WO-2008145187 A1    12/2008
WO    WO-2010005349 A1    1/2010

OTHER PUBLICATIONS

"Universal Mobile Telecommunications System (UMTS); Introduction of the Multimedia Broadcast/Multicast Service (MBMS) in the Radio Access Network (RAN); Stage 2 (3GPP TS 25.346 version 10.0.0 Release 10)", ETSI TS 125 346 V10.0.0, Mar. 2011, 73 pages.

(Continued)

*Primary Examiner* — Mahran Abu Roumi
(74) *Attorney, Agent, or Firm* — Patents on Demand P.A.; Brian K. Buchheit; Scott M. Garrett

(57) ABSTRACT

The present invention relates to methods and arrangements to optimize load transportation between a P2P live streaming network and an access network. The method comprises steps like: a peer in the access network selects a live channel to use; a request comprising information of the selected channel is sent from the access network to the streaming network a converter node connecting the P2P live streaming network and the access network detects that a number of peers in the access network using the selected channel has reached a predetermined threshold value (T) and chunks that are parts of the selected channel arriving from peers in the streaming network are converted in the converter node from P2P format to multicast format.

14 Claims, 7 Drawing Sheets

(51) Int. Cl.
*H04L 29/06* (2006.01)
*H04N 21/266* (2011.01)
*H04L 29/08* (2006.01)
*H04N 21/63* (2011.01)

(58) Field of Classification Search
CPC ....... H04L 45/16; H04L 12/185; H04L 12/18; H04L 45/00; H04L 49/201
USPC ......................................................... 709/204
See application file for complete search history.

(56) References Cited

U.S. PATENT DOCUMENTS

| | | | |
|---|---|---|---|
| 2010/0177773 A1* | 7/2010 | Kolhi ................. | H04L 12/1836 370/390 |
| 2011/0093607 A1* | 4/2011 | Wang ................. | H04L 65/4084 709/231 |
| 2011/0238756 A1* | 9/2011 | Damola ............... | H04L 67/104 709/204 |
| 2012/0057697 A1* | 3/2012 | Holtmanns ........... | H04L 9/0838 380/42 |
| 2013/0212228 A1* | 8/2013 | Butler ................. | H04L 65/605 709/219 |

OTHER PUBLICATIONS

Notification of Transmittal of the International Search Report and the Written Opinion of the International Searching Authority, or the Declaration for PCT Counterpart Application No. PCT/SE2012/050619, dated Aug. 10, 2012, 10 pages.

* cited by examiner

P2P STREAMING SUPPORT

CROSS-REFERENCE TO RELATED APPLICATIONS

This application is a National stage of International Application No. PCT/SE2012/050619, filed Jun. 8, 2012, which claims priority to U.S. Application No. 61/599,646, filed Feb. 16, 2012, which are hereby incorporated by reference.

TECHNICAL FIELD

The present embodiments generally relate to systems and methods and, more particularly, to mechanisms and techniques for enabling optimized load transportation between a P2P live streaming network and an access network.

BACKGROUND

Companies are rapidly adding dynamic, rich and interactive capabilities to improve user experiences, grow online audiences, and drive page views and transactions. As Web sites evolve toward completely rich, dynamic online channel experiences, businesses face a new, but stark challenge. Today's consumers have come to expect highly interactive online experiences. When e.g. watching a movie, they demand a smooth, flawless experience. In the International Application WO2010/005349 is disclosed a method for an IPTV Set Top Box to access content from an external domain outside the IPTV service provider's domain by retrieving and converting required content from the external domain into a format that is accessible via the IPTV Set Top Box.

P2P streaming applications work in much the same way as other P2P file share clients except that instead of downloading files, the users download streams. These streams are then exchanged in real-time with other users.

Figure 1:
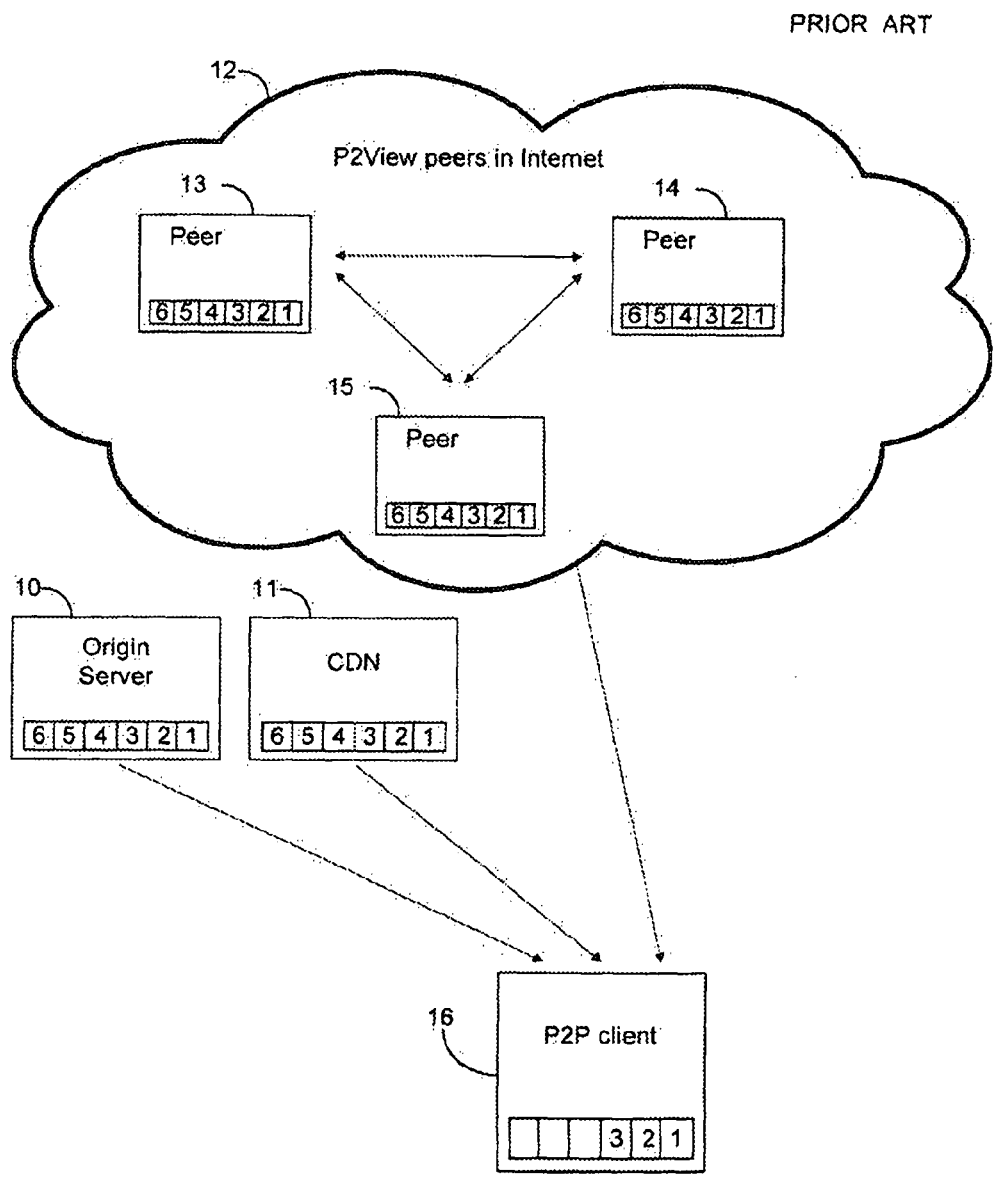

FIG. 1 discloses Peer2View (P2View) which is a Peer-to-Peer live streaming application. FIG. 1 shows an Internet network 12 comprising P2View peers 13-15. The figure also discloses an origin server 10, a Content Distribution Network CDN 11 and a P2P client 16. The figure shows delivering of HTTP streams made out of HTTP chunks 1-6. The chunks are delivered either from the origin server or a server in the content distribution network CDN i.e. the file that is to be streamed has been broken up in chunks and is streamed from either the origin, server or a server in the CDN network. In case many clients simultaneously ask for streams from a server it may result in system overload. Due to this, instead of having one server (origin or CDN) the server has been broken down into smaller peers (Peer2View peers in the Internet) and the chunks are now also part of every peer 13-15. When the P2P client 16 is looking for e.g. chunk 4 it will make a decision which chunk source is the closest or shortest in terms of delay, and fetch chunk 4 from there. An example of the basic principle is as follows. When the P2P client 16 enters the system, the client starts to ask for existing, video, stream channels. The client hereby contacts a channel list server (not in figure) and the server returns back a list of channels. The client makes a selection of a desired channel and contacts a tracker (not in figure) in the Internet network. The tracker knows of all the peers 13-15 already receiving the channel of interest. The tracker also has knowledge of the CDN server 11 and the origin server 10. The P2P client performs measurements e.g. by using a BART method for available bandwidth estimation, between all replied peers to see which peer is the most appropriate to ask for a needed chunk and then makes a chunk request.

Problems exist with the above described technique. A first problem is that the P2P stream generates a lot of traffic. According to P2P principles, if a chunk is received, the recipient of the chunk has to share a chunk back. The problem with P2P is that when there is an "unlimited" amount of peers receiving and sharing, it will be difficult for the operator to dimension, network capacity. A second problem is that the impact of this big amount of traffic on the network creates contention for best effort traffic class. A third problem is extra costs such as increased costs for mobile access (air-interface), transport cost in aggregation and backbone network, and increased cost for Internet peering.

SUMMARY

An aim of the embodiments is to overcome above mentioned limitations of the prior art. The embodiments focus on sending P2P live streaming in a non-P2P way by putting together via a converter node, a Multicast Server in an access network with a P2P live streaming network. If peers in the access network are using/viewing the same channel and if the number of the peers is above a threshold value, instead of using P2P, multicasting for chunk transportation will be used.

An object of the invention is to optimize load transportation.

The solution in one exemplified embodiment is a method to optimize load transportation between a P2P live streaming network and an access network. The method comprises the following steps:
- A peer in the access network selects a live channel to use.
- A request comprising information of the selected channel is sent from the access network to the streaming network.
- A converter node connecting the P2P live streaming network and the access network detects that number of peers in the access network using the selected channel has reached a predetermined threshold value.
- Chunks that are parts of the selected channel, arriving from peers (13-15) in the streaming network, are converted in the converter node to multicast format.

The solution in another exemplified embodiment is a network node of a telecommunication network configured to optimize load transportation. The network node comprises:
- Means for intercepting signalling transmitted from peers in an access network to a P2P live streaming network.
- Means for detecting reach of a threshold value corresponding to number of peers in the access network using a selected channel.
- Means for converting chunks received from peers in the P2P live streaming network into multicast format.

The solution in yet another exemplified embodiment is a terminal node in a telecommunication network being configured to receive multicast streaming. The node comprises:
- Means for extracting bearer information received from a multicast server.
- Means for receiving a switch message initiating receiving of multicast streaming.
- Means for opening a multicast socket.
- Means for stopping a P2P streaming client.

Some advantages of the embodiments are as follows:

The solution makes possible, utilization of enhanced Multimedia Broadcast and Multicast services eMBMS for the delivery of live streams in Long Term Evolution LTE that are distributed via P2P over the internet.

The solution enables/allows to get rid of P2P traffic in the network which consumes a lot of bandwidth and deliver streams using multicast which is the preferred way of delivery 1-n streams.

The invention will how be described more in detail with the aid of preferred embodiments iii connection with the enclosed drawings.

BRIEF DESCRIPTION OP THE DRAWINGS

FIG. 1 belongs to the prior art and discloses a block schematic illustration, showing delivering of HTTP streams made out of HTTP chunks from a P2P live streaming network to a P2P client.

Figure 2:
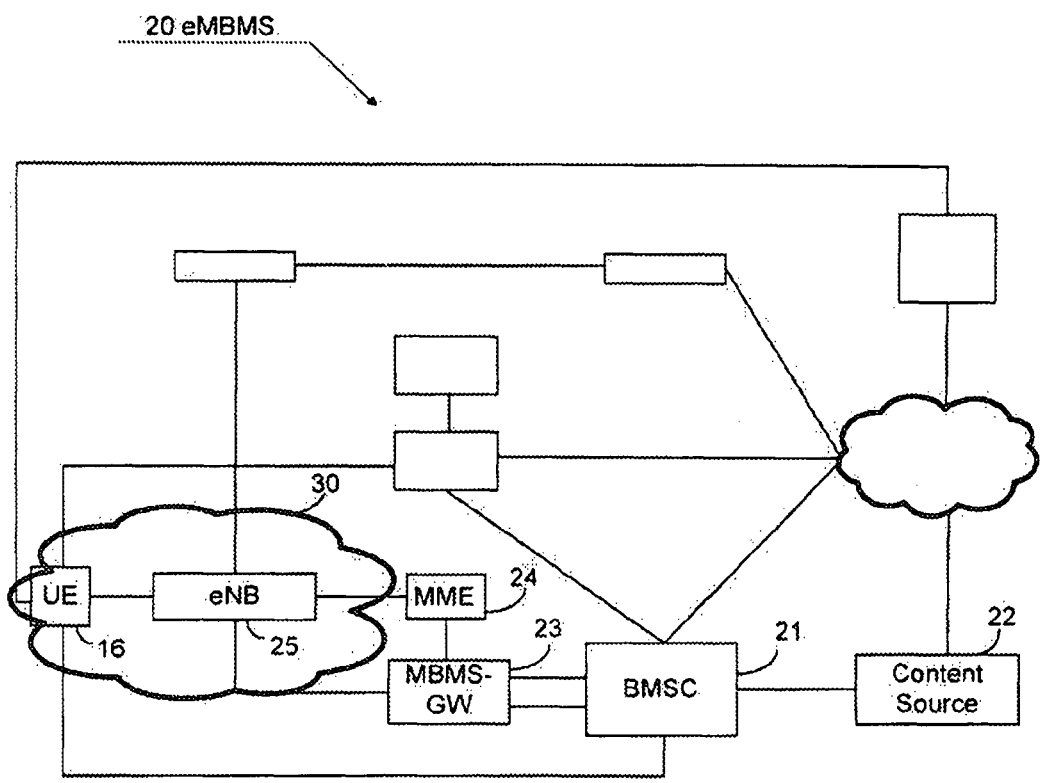

FIG. 2 belongs to the prior art and discloses a block schematic illustration of enhanced Multimedia Broadcast and Multicast Services eMBMS functions using eMBMS interfaces.

Figure 3:
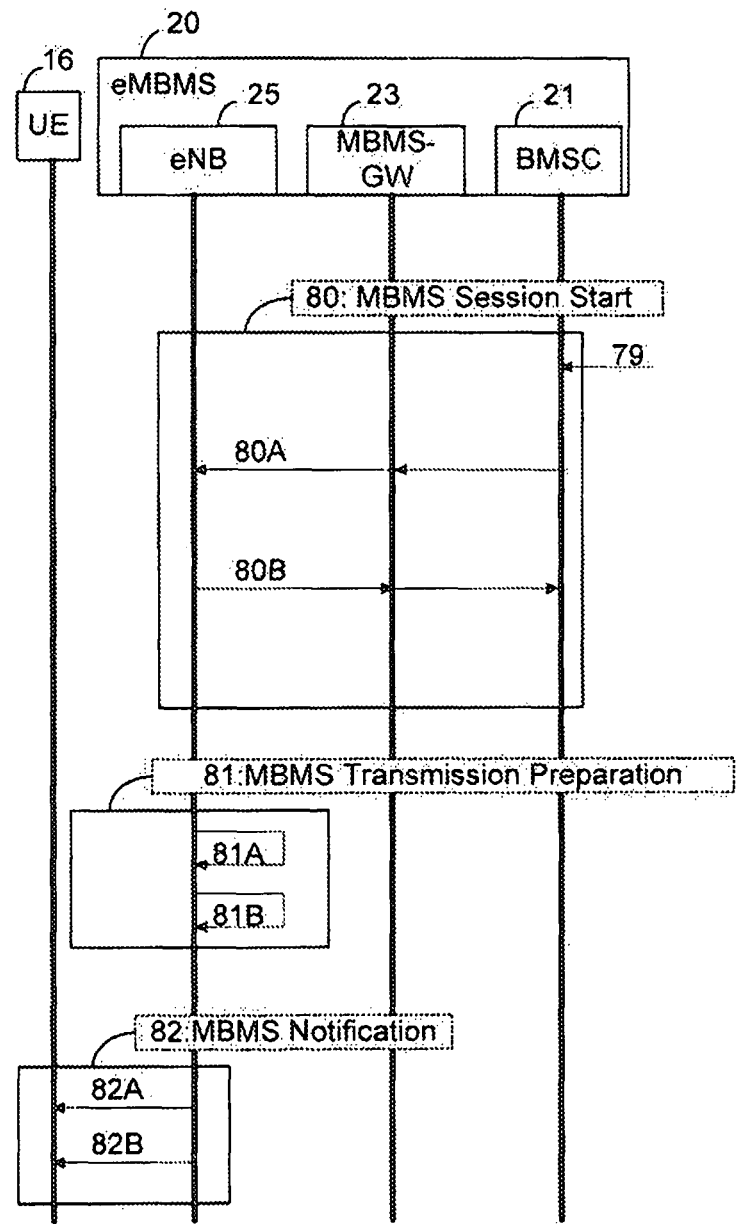

FIG. 3 belongs to the prior art and discloses a signalling sequence diagram showing Multimedia Broadcast and Multicast Services. Session start, preparation and notification.

Figure 4:
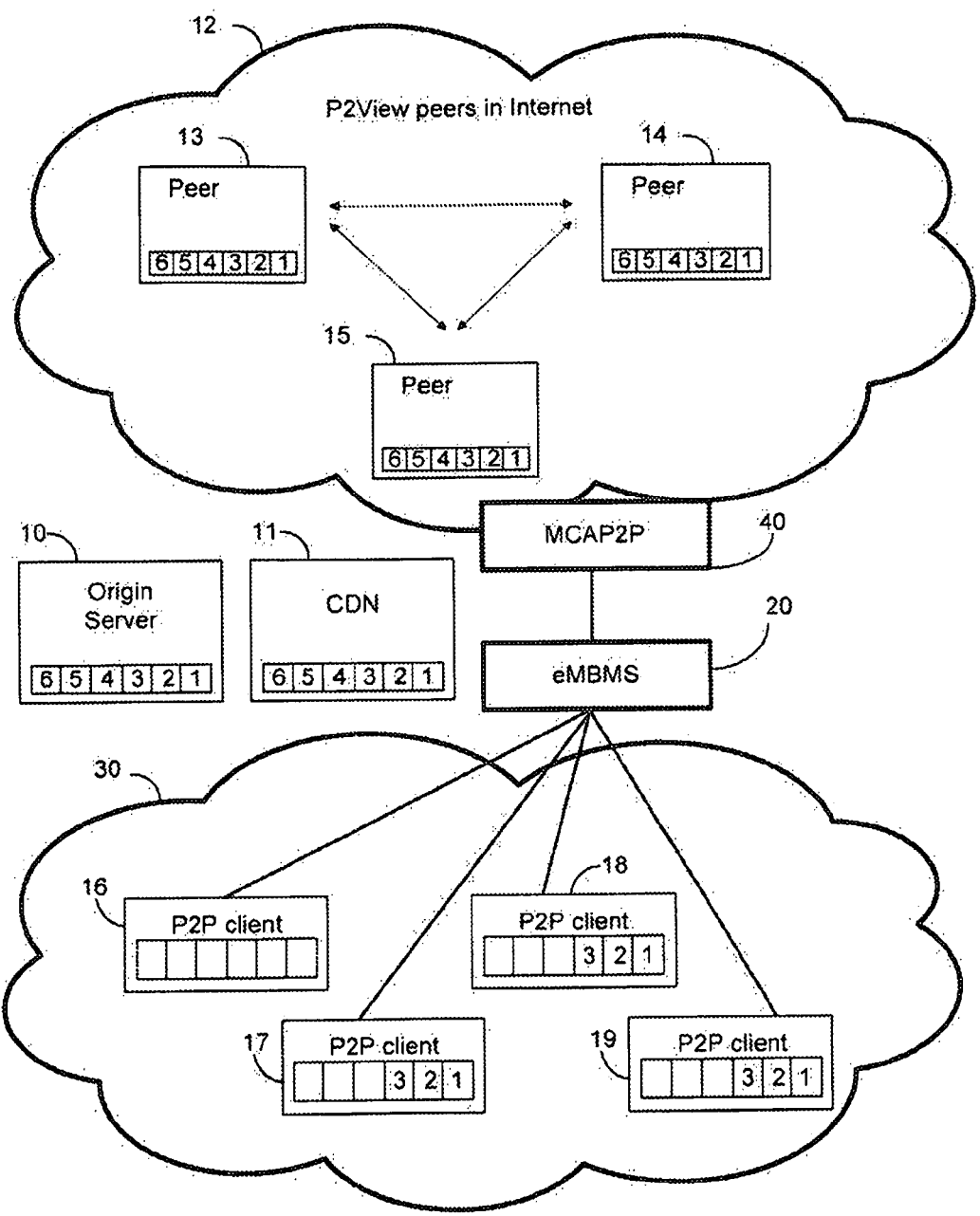

FIG. 4 discloses a block schematic illustration of a solution overview focusing on sending P2P live streaming in a non-P2P way by putting together via a converter node, a Multicast Server in an access network with a P2P live streaming network.

Figure 5:
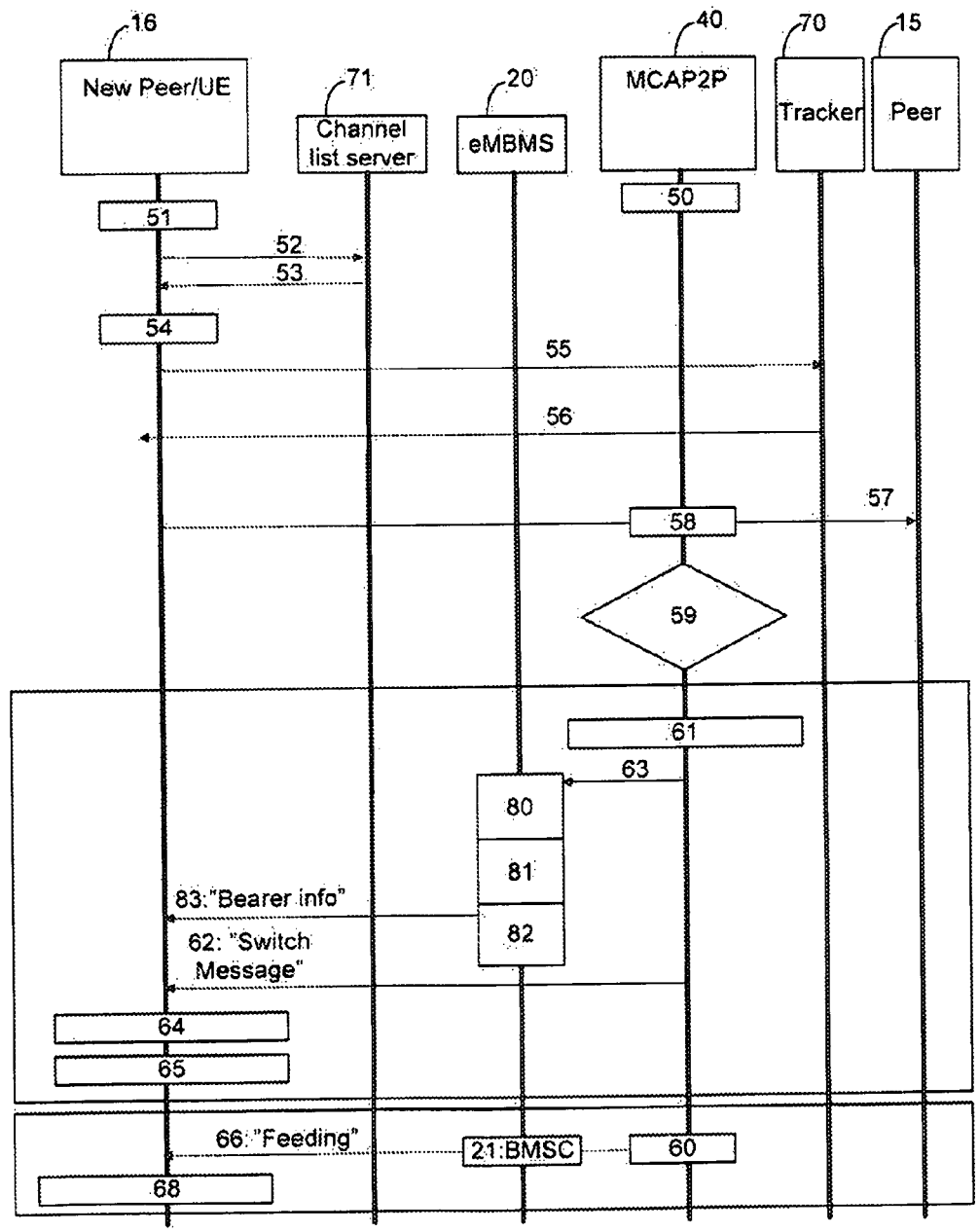

FIG. 5 discloses in a signalling sequence diagram a method of sending of P2P live streaming in a non-P2P way by using multicasting.

Figure 6:
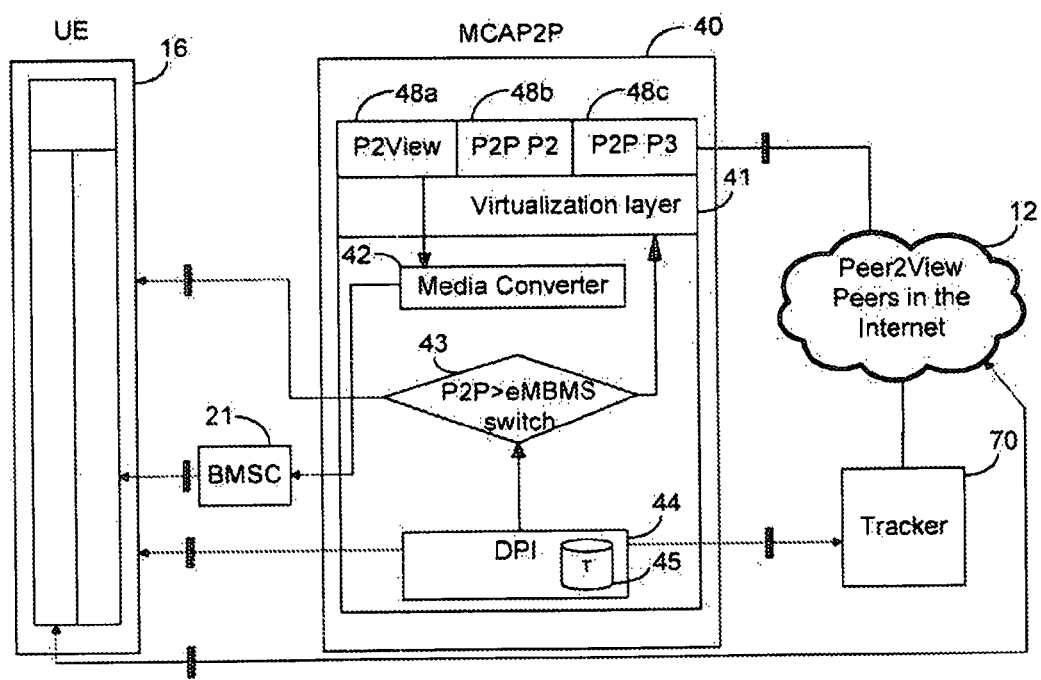

FIG. 6 discloses a block schematic illustration of a converter node.

Figure 7:
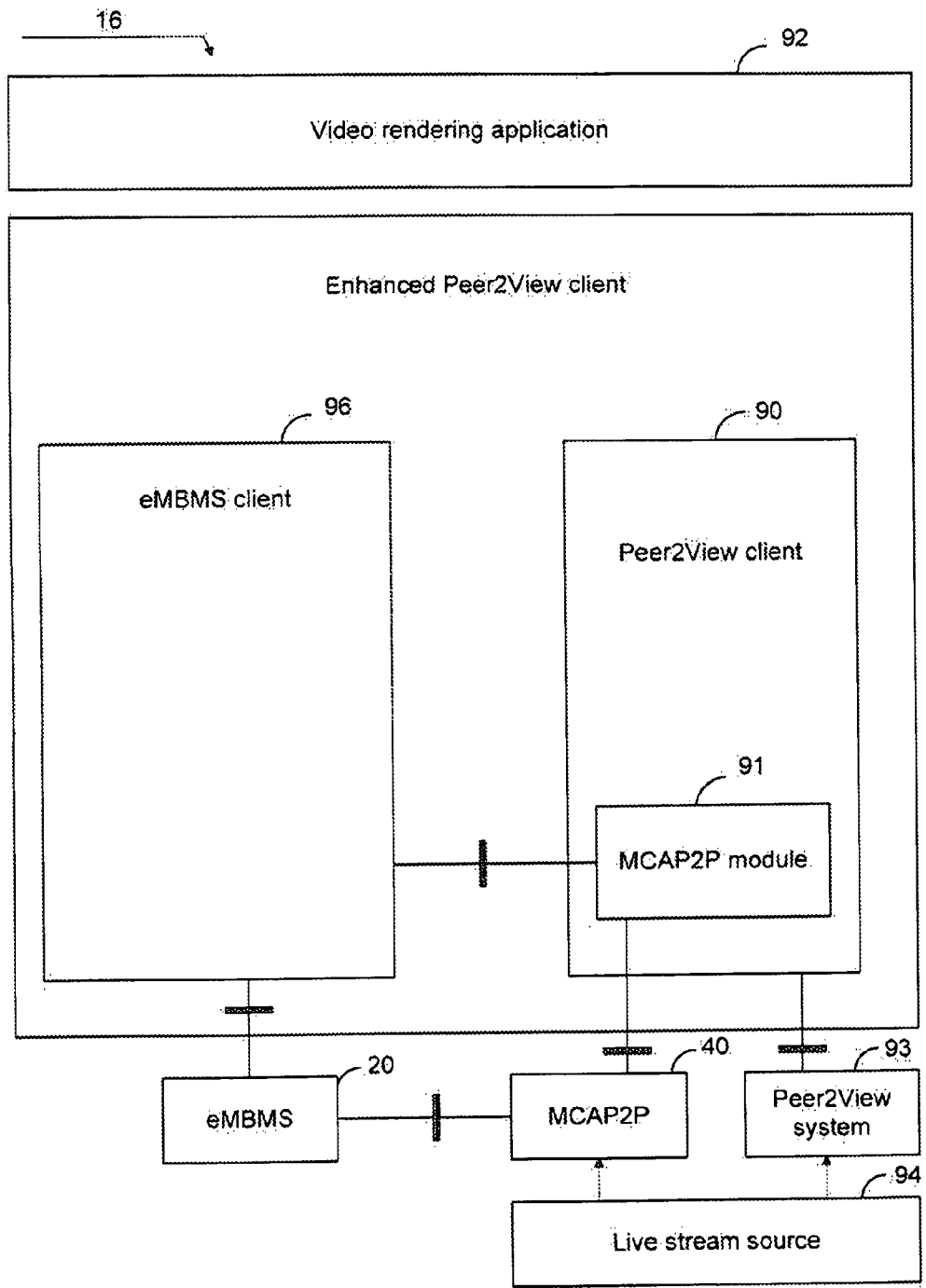

FIG. 7 discloses a block schematic illustration of a client.

DETAILED DESCRIPTION

In the following description, for purposes of explanation and not limitation, specific details are set forth, such as particular circuits, circuit components, techniques, etc. in order to provide a thorough understanding of the present embodiments. However, it will be apparent to one skilled in the art that the present examples may be practiced in other embodiments that depart from these specific details. In other instances, detailed descriptions of Well known methods, devices, and circuits are omitted so as hot to obscure the description of the present embodiments with unnecessary detail.

While P2P works very well over the Internet it is hot desirable inside an operator's access network wherein multicast would be to prefer. FIG. 2 belongs to the prior art and discloses ah enhanced Multicast Broadcast Media Server eMBMS 20, also called a multicast server 20. The figure shows eMBMS functions using eMBMS interfaces. Multimedia Broadcast and Multicast services MBMS is a broadcasting service offered via cellular networks. Enhanced MBMS (eMBMS) is used to denominate MBMS service in Evolved Packet Systems including E-UTRAN (LTE) and UTRAN access. The eMBMS comprises a Broadcast Multicast Service Centre BMSC 21. The BMSC is a 3GPP specified solution for Multicasting in 3G networks. The BMSC is responsible for triggering multicast inside the operator's network 30. The stream will come from the content source 22 i.e. for example from an Internet server. The BMSC handles MBMS sessions and is responsible to deliver user plane media to a MBMS-GW 23. The MBMS-GW provides functionality for sending/broadcasting of MBMS packets to each eNB 25 transmitting the service. The MME 24 provides Session Control of MBMS bearers to the E-UTRAN access. The stream will be fed into the BMSC that will forward the stream into the operator's network 30 in a multicast way. See e.g. document 3GPP TS 25.346 or the reference design EAB-11:045744 Uen for a more detailed description. FIG. 3 belongs to prior art and discloses an overview of the eMBMS session establishment. The figure discloses the UE 16, the eMBMS 20 comprising the eNB 25, the MBMS-GW 23 and the BMSC 21. Upon receiving a triggering signal 79 the BMSC sends a Session Start Request signal 80A to the MBMS-GW. The MBMS-GW forwards the Session Start Request signal 80A to the eNB 25 via the MME 24 (not in FIG. 3). The eNB,MME and MBMS-GW respond with a Session Start Response message 80B to the BMSC. The described signalling sequence is called MBMS Session Start 80. Resources in the access network needs to be reserved for the MBMS broadcast well in time before a MBMS transmission. It is assumed that the configured Admission control 81A limits in the eNB are set in such a way that the MBMS sessions can be started on time and resources are allocated 81B for transmission. This signalling is in the figure called 81 MBMB Transmission Preparation. The client UE will get a notification 82A that consists of a direction to a multicast, socket that the user equipment should listen to. The messages 82A and 82B will ensure that the user equipment knows on what socket to listen, to i.e. the messages work like an implicit join. This signalling is in the figure called 82: MBMS Notification. The multicast notification comes in the information about which channels are available. When the UE gets that information it opens a socket. In other words, the server announces that there is a channel open and the UE opens the socket as soon as the data starts coming. See e.g. document 3GPP TS 25.346 or the reference design EAB-11:045744 Uen for a more detailed description of the session establishment. The embodiments that now will be discussed are applicable for both MBMS and eMBMS in order to cover both 3G and LTE cases.

FIG. 4 discloses a solution overview of the embodiments that below will be discussed more in detail. The solution overview shows P2view peers 13-15 in the Internet 12. The figure further discloses P2P clients 16-19 in an access network 30. An Origin Server 10 and a server 11 in a Content Distribution Network CDN is shown in FIG. 4. The servers 10-11 and the peers 13-15 are in this example in possession HTTP streams made out of HTTP chunks 1-6. In this example, three P2P clients 17-19 out of the four clients 16-19 are viewing the same live stream channel and are in possession of chunks 1,2,3. The chunks 1,2,3 each one has been fetched, in this example from the origin server 10, the CDN server 11 and peer 15 respectively. The fetching of chunks has been done in accordance to prior art. According to the embodiments, the Internet 12 and the access network 30 are joined together via a converter node (Mobile Cloud Accelerator Peer to Peer) MCAP2P 40 and an enhanced Multicast Broadcast Media Server eMBMS 30. The eMBMS has been explained above and the converter node will be further discussed below.

FIG. 5 discloses in a first embodiment a method of sending P2View streaming in a non-P2P way by using multicasting. FIG. 5 discloses the P2P client 16, a channel, list server 71, the eMBMS 20, the converter node MCAP2P 40, a Tracker 70 and a Peer 15 in the Internet. The Channel list server 71 comprises a list of available live stream channels that clients may want to use. The Tracker 70 selects set of peers to download data chunks from. The Tracker functions as a gateway between peers in the P2P network. In P2P systems based on Tracker architecture when a client requests content, it contacts the Tracker in order to obtain addresses of peers having the desired data chunks. The Tracker replies with a list of addresses to peers having the data. The method of using multicasting instead of using P2P for chunk transportation if peers in the access network are viewing the same channel and if the number of the peers is above a threshold value will now be explained. A prerequisite in this example is that the P2P clients 17-19 in the access network are viewing the same live stream (see FIG. 4). The method according to the first embodiment comprises the following steps:

A threshold value for number of peers viewing the same channel is set 50 in the converter node 40. In this example the threshold value has been set to "four". As said, three P2P clients 17-19 are already viewing the same live stream.

The signalling that will be discussed in this paragraph is part of the prior art. The P2P client 16 enters the system and joins 51 the P2View network and the client starts to ask 52 for existing video stream channels. The client hereby contacts the channel list server 71 and the server returns back 53 a list of channels. The client makes a selection of a desired channel which is the same channel as the clients 17-19 are viewing. The client 16 contacts 55 the Tracker 70 in the Internet network. The Tracker knows of all the peers 13-15 in the Internet in possession of required chunks that are part of the requested channel and also has knowledge of the CDN server 11 and the origin server 10. The Tracker sends a Tracker response 56 back to the client 16. The response includes a list of peers (usually IP addresses) already watching the channel. The P2P client performs measurements, e.g. by using a BART method for available bandwidth estimation, between all replied peers to see which peer is the most appropriate to ask for a needed chunk. In this example the most appropriate peer to ask for the chunk is among the P2View peers in the internet but also the servers 10 or 11 may be considered. The client asks for a list of chunks from the peer 15 in the Internet in possession of the chunks relating to the selected live stream channel by sending a chunk list request 57 to that peer. The request comprises channel information.

According to the first embodiment the chunk list request 57 is Intercepted 58 in the converter node 40 regarding the channel information.

The number of peers (now including the new peer 16) using the same channel is compared 59 to the threshold value. The number is four and the threshold value "four" is found to have been reached.

Mode switching (in all peers 16-19 viewing the same channel) from P2P to multicast is initiated 61 in the converter node 40.

a mode switch message is sent 63 from a Media Converter 42 (see FIG. 6) in the converter node 40 to the eMBMS 20. The mode switch message corresponds to the triggering message 79 earlier disclosed in FIG. 3.

The eMBMS starts the MBMS session 80 as earlier explained in FIG. 3.

The eMBMS performs MBMS. Transmission preparation 81 as earlier explained in FIG. 3.

The eMBMS performs MBMS Notification 82 as explained in FIG. 3. This result in, signal ling from eMBMS to the client as explained earlier in FIG. 3 by the signalling 82A and 82B. This is disclosed by bearer info message 83 in FIG. 5. For simplicity reasons only one client is referred to in FIG. 5 but the signalling is sent to all clients 16-19 using the channel. Bearer information is extracted by the client from the message 83 This information is used by the client to know what multicast bearer to join.

A Switch message 62 is sent from a P2P to multicasting switch 43. (see FIG. 6) in the converter node 40 to the client 16 and upon receiving the message a MBMS socket is opened 64 and a P2P stream client is stopped 65 in the client 16.

The converter node 40 activates 60 the converting of chunks from P2P format into multicast MSBM format. Converting from P2P format into multicast format e.g. DASH or HLS over MBMS download belongs to prior art.

MBMS data broadcast is fed 66 from 43 in the converter node 40 via the BMSC 21 to the client 16.

Chunks are fed 68 in the client 16 from the MBMS socket to a video client.

FIG. 6 discloses a block schematic illustration of a converter node 40, in this embodiment also called a Mobile Cloud Accelerator Peer to Peer MCAP2P 40. FIG. 6 discloses the MCAP2P architecture. The converter node comprises a Media converter 42, a P2P to multicasting switch 43 and an interception unit 44. The MCAP2P module further Comprises a virtualization layer 41 upon which it is possible to deploy and instantiate different P2P protocols, depending on the protocols used by the terminals. The Visualization layer 41 permits shared hardware recourses and different applications 48a-c to be run by the hardware resources. P2PView, Bittorent and P2PLive for example represent server software that can be placed on top of the virtualization layer and be run by hardware. In this example a P2view-application 48a has been placed on top of the Virtualization layer and the MCAP2P in this example acts as a standard P2View client. The Media Converter 42 converts HTTP chunk from P2View format into multicast format. The switch 43 initiates the eMBMS to prepare, and notify user equipment to receive multicast streaming. The interception unit 44 comprises a Deep Packet Inspection module that is able to extract information from a passing message. The interception unit comprises in this example a data base 45 in which a threshold value T for number of clients using/viewing same channel is stored. FIG. 6 further discloses the client 16 that is attached via interfaces to the switch 43 and the interception unit 44 in the converter. The user equipment is further attached via the BMSC 21 to the Media Converter 42. The Tracker 70 is attached via an interface to the interception, unit 44. Internet 12 is attached via interfaces to the converter node 40, to the Tracker 70 and to the client 16. After reached threshold T, a trigger is sent from the interception unit 44 to the switch 43 that sends the mode switch message 62 (see FIG. 5) to the client 16 in order to switch mode. Chunks are received to the P2View application 48a from Peer2view Peers 13-15 in possession of required chunks in the Internet. Chunks belonging to a selected channel are sent from Internet to the P2View application 48a. The received chunks in P2View format are forwarded to the Media Converter 42 and converted to Multimedia Broadcast and Multicast services MBMS format and sent in Multicast format to the BMSC 21 in the eMBMS 20. Chunks are then streamed from the BMSC in the eMBMS to the client 16 in a Multicast Way.

FIG. 7 discloses a block schematic illustration of a Client. The figure discloses the User Equipment architecture. A Peer2View (P2P streaming) client 90 comprising a MCAP2P module 91 is seen in the figure. The MCAP2P module will receive the switch message 62 that were explained in FIG. 5. A video rendering application 92 will receive chunks from a Live stream source 94 either from the P2View system 93 or after the threshold has been reached from the multicast system via the MCAP2P 40. An eMBMS client 96 receives, the MBMS notification 82 (see FIG. 5) via the eMBMS 20 whereby TGMI will be extracted. After the mode switch message 62 (see FIG. 5) from MCAP2P 40 an MBMS socket in the eMBMS client will be opened and the client 90 will be stopped. In case of a reached threshold, chunks will be received from the opened MBMS socket and forwarded in the client to the video rendering application 92.

System and nodes that can be used to put the invent ion into practice is schematically shown in the figures. Enumerated items are shown in the figures as individual elements. In actual implementations of the invention, however, they may be inseparable components of other electronic devices such as a digital computer. Thus, actions described above may be implemented in software that may foe embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The systems and methods of the present invention may be implemented for example on any of the Third Generation Partnership Project (3GPP), European Telecommunications Standards Institute (ETSI), American National Standards Institute (ANSI), Long Term Evolution (LTE) or other standard telecommunication network architecture. Other examples are the Institute of Electrical and Electronics Engineers (IEEE) or The Internet Engineering Task Force (IETF).

The description, for purposes of explanation and not limitation, sets forth specific details, such as particular components, electronic circuitry, techniques, etc., in order to provide an understanding of the present invention. But it will be apparent to one skilled in the art that the present invention may be practiced in other embodiments that depart from these specific details. In other instances, detailed descriptions of well-known methods, devices, and techniques, etc., are omitted so as not to obscure the description with unnecessary detail. Individual function blocks are shown in one or more figures. Those skilled in the art will appreciate that functions may be implemented using discrete components or multi-function hardware. Processing functions may be implemented using a programmed, microprocessor or general-purpose computer. The invention is not limited to the above described and in the drawings shown embodiments but can be modified within the scope of the enclosed claims.

The invention claimed is:

1. A method to optimize load transportation between a peer-to-peer (P2P) live streaming network and an access network, the method comprising:

selecting, by a peer, in the access network a channel to use;

sending a request comprising information of a selected channel, from the access network to the P2P live streaming network;

detecting, in a converter node connecting the P2P live streaming network and the access network, if a number of peers in the access network using the selected channel has reached a predetermined threshold value; and converting, in the converter node, chunks that are parts of the selected channel and arriving from the peers in the P2P live streaming network, from a P2P format to a multicast format, to optimize the load transportation between the P2P live streaming network and the access network, wherein a request is intercepted by using Deep Packet Inspection;

extracting in the detected peers bearer information from a bearer info message received from a multicast server;

receiving by the detected peers a switch message from the converter node;

opening in the detected peers a multicast socket;

feeding a channel stream received to a detected peer from the multicast socket to a video client; and stopping in the detected peers a P2P stream client.

2. The method to optimize the load transportation according to claim 1, further comprises:

initiating a mode switching by sending a mode switch message from the converter node to a multicast server.

3. The method to optimize the load transportation according to claim 2, further comprises:

initiating by the converter node detected peers, to switch from a P2P mode to a multicast mode.

4. The method to optimize the load transportation according to claim 3, further comprises:

forwarding the chunks converted from the P2P format to the multicast format, from the converter node to the multicast server;

forwarding the chunks converted from the P2P format to the multicast format, in a multicast way from the multicast server to the detected peers.

5. The method to optimize the load transportation according to claim 1, further comprises:

intercepting the request in the converter node.

6. A non-transitory program storage medium storing computer program code to optimize load transportation between a peer-to-peer (P2P) live streaming network and an access network, which when the computer program code is executed in a processor to:

select, by a peer, in the access network a channel to use;

send a request comprising information of a selected channel, from the access network to the P2P live streaming network;

detect, in a converter node connecting the P2P live streaming network and the access network, if a number of peers in the access network using the selected channel has reached a predetermined threshold value; and convert, in the converter node, chunks that are parts of the selected channel and arriving from the peers in the P2P live streaming network, from a P2P format to a multicast format, to optimize the load transportation between the P2P live streaming network and the access network, wherein a request is intercepted by using Deep Packet Inspection;

extract in the detected peers bearer information from a bearer info message received from a multicast server;

receive by the detected peers a switch message from the converter node;

open in the detected peers a multicast socket;

feed a channel stream received to a detected peer from the multicast socket to a video client; and stop in the detected peers a P2P stream client.

7. A network node of a telecommunication network operative to optimize load transportation between a peer-to-peer (P2P) live streaming network and an access network, said network node comprising:

a processor;

a memory storing instructions for execution by the processor, said network node operative to:

detect, in a the network node, which connects the P2P live streaming network and the access network, if a number of peers in the access network using a selected channel has reached a predetermined threshold value; and convert, in the network node, chunks that are parts of the selected channel and arriving from the peers in the P2P live streaming network, from a P2P format to a multicast format, to optimize the load transportation between the P2P live streaming network and the access network, wherein a request is intercepted by using Deep Packet Inspection;

convey a switch message from the network node to the detected peers, each of which extracts bearer information from a bearer info message received from the multicast server, wherein a multicast socket is opened in the detected peers;

convey a channel stream to each of the detected peers, wherein each of the detected peers feeds the channel stream from the multicast socket to a video client, wherein each of the detected peers stops a P2P stream client.

8. The network node of claim 7, further operative to:
initiate a mode switching by sending a mode switch message to a multicast server.

9. The network node of claim 8, further operative to:
send a switch message to detected peers in the access network to influence the peers to switch from a P2P mode to a multicast mode.

10. The network node of claim 9, further operative to:
forward the chunks converted from the P2P format to the multicast format, to the multicast server.

11. The network node of claim 7, further operative to:
store the threshold value.

12. The network node of claim 7, comprising:
a virtualization layer operative to deploy and instantiate different protocols depending on the protocols used by attached terminals.

13. A terminal node of a telecommunication network, said terminal node comprising:

a processor;

a memory storing instructions for execution by the processor, said terminal node operative to:

select, by the terminal node, which is a peer, in the access network a channel to use;

send a request comprising information of the selected channel to a P2P live streaming network, wherein a converter node connecting the P2P live streaming network and an access network converts chunks that are parts of the selected channel and arriving from the peers in the P2P live streaming network, from a P2P format to a multicast format, to optimize the load transportation between the P2P live streaming network and the access network, wherein a request is intercepted in the converter node by using Deep Packet Inspection;

extract bearer information received from a multicast server;

receive a switch message initiating receiving of multicast streaming;

open a multicast socket;

receiving a channel stream at the terminal node, which is a detected peer, from the multicast socket to a video client of the detected peer; and stop a peer-to-peer (P2P) streaming client.

14. The terminal node of a telecommunication network, according to claim 13, said terminal node further operative to:

play out received multicast streaming media.

* * * * *